United States Patent [19]

Pescatore et al.

[11] Patent Number: 4,612,712

[45] Date of Patent: Sep. 23, 1986

[54] MACHINE FOR HEATING AN ARTICLE OR PRODUCT BY VAPOR CONDENSATION

[75] Inventors: Richard Pescatore, Antibes; Jean-Jack Boumendil, Villeneuve-Loubet, both of France

[73] Assignee: Piezo-Ceram Electronique, Antibes, France

[21] Appl. No.: 745,412

[22] PCT Filed: Oct. 10, 1984

[86] PCT No.: PCT/FR84/00226

§ 371 Date: Jun. 11, 1985

§ 102(e) Date: Jun. 11, 1985

[87] PCT Pub. No.: WO85/01791

PCT Pub. Date: Apr. 25, 1985

[30] Foreign Application Priority Data

Oct. 11, 1983 [FR] France ............................... 83 16113

[51] Int. Cl.⁴ ............................................. F26B 15/18
[52] U.S. Cl. ................................................ 34/68; 34/78; 112/61; 134/105; 165/110; 228/180.1; 228/240; 432/197
[58] Field of Search ................... 34/36, 68, 73, 74, 76, 34/77, 78, 82; 68/5 D, 5 E, 18 C; 118/61, 64, 66; 134/11, 31, 105, 109, 122 R, 122 D; 165/110, 111; 202/170; 228/240, 242, 180.1; 432/90, 91, 185, 194, 197

[56] References Cited

U.S. PATENT DOCUMENTS 3,904,102 9/1975 Chu et al. ............................... 34/27
4,032,033 6/1977 Chu et al. ............................... 134/31
4,055,217 10/1977 Chu et al. ............................ 228/180.1
4,115,601 9/1978 Ammann et al. ..................... 228/242
4,389,797 6/1983 Spigarelli et al. ....................... 34/78

FOREIGN PATENT DOCUMENTS 851743 6/1977 Belgium .
23107 1/1981 European Pat. Off. .
2243045 4/1975 France .

Primary Examiner—Albert J. Makay
Assistant Examiner—David W. Westphal
Attorney, Agent, or Firm—A. W. Breiner

[57] ABSTRACT

A machine for heat-treating articles or products with solvent vapors of the in-line type which comprises a tunnel, displacement means for conveying the articles of products to be heated from the inlet of the tunnel to its outlet and, in the following order, a first chamber for the condensation of a secondary vapor, a second chamber for the vaporization of a secondary liquid and for the complementary condensation of a primary vapor, a third chamber for heating the article or product to be heated and which is filled with the primary vapor, a fourth chamber for the vaporization of secondary liquid and for the complementary condensation of the primary vapor, and a fifth chamber for the condensation of the secondary vapor. The chambers have a cross-section larger than that of the tunnel, and are distributed along the tunnel and are interconnected by sections of the tunnel. The machine is efficient, with there being little or no loss of solvent vapors during use.

5 Claims, 2 Drawing Figures

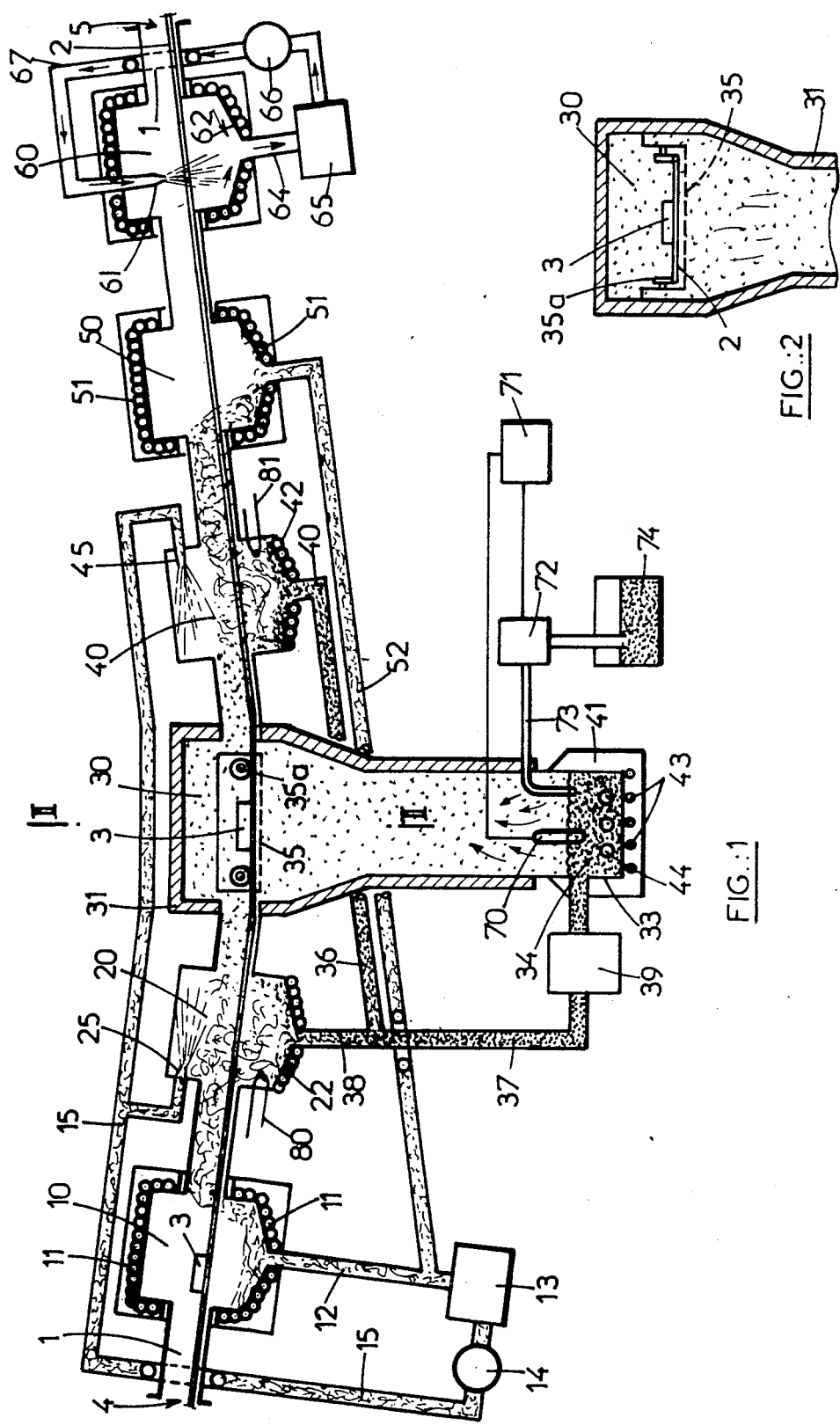

MACHINE FOR HEATING AN ARTICLE OR PRODUCT BY VAPOR CONDENSATION

The invention relates to an improved machine for heating an article or product by condensing vapour thereon.

From French Pat. No. 2,243,045 there is known a machine for heating an article at an elevated temperature, for example with a view to subjecting it to welding or brazing operations, by condensing thereon the vapour of a liquid with a high boiling point, which comprises an enclosure open to the atmosphere and adapted to contain a primary liquid having a boiling point which is at least equal to the said elevated temperature; means of heating which are close to the lower end of the enclosure and adapted to boil the primary liquid to produce primary vapour, primary means for condensation at a first height above the bottom of the enclosure and adapted to condense the primary vapour to primary liquid at the first height; primary means for collecting condensate which are associated with the primary means for condensation and adapted to collect the condensed primary vapour originating therefrom; a first conduit forming communication between the primary means for collecting condensate and the lower part of the enclosure and adapted to convey condensed primary vapour from the primary means for collecting condensate towards the lower part of the enclosure; means for establishing a mass of secondary vapour in the enclosure above the primary vapour; secondary means for condensation at a second height above the first height and adapted to condense the secondary vapour to secondary liquid at the second height, secondary means of collecting condensate which are associated with the secondary means of condensation and adapted to collect the secondary condensed vapour originating therefrom; and a second conduit providing a communication between the secondary means of collecting condensate and the primary means of collecting condensate, and adapted to convey the condensed secondary vapour from the secondary means of collecting condensate to the primary means of collecting condensate.

The operation of this machine is satisfactory. Nevertheless, ever-increasing requirements of industrialists mean that there is a need for an improved machine.

The invention consequently proposes to provide a machine for "in-line"-type heating of an article or product by condensing vapour thereon, which, as a result of its novel design, makes it possible in particular:

to suppress the heat changes inherent in the machines available on the market at the present time by avoiding or minimising as much as possible the mixing of vapour of the primary and secondary liquids in the enclosure for heating the articles;

to control the heat cycle accurately;

to employ mixtures of liquids with different boiling points;

optionally, to clean the product or the article as efficiently as possible after a treatment.

The invention relates to an improved machine for heating an article or product at an elevated temperature by condensing vapour thereon, which comprises:

a chamber for heating the article or product to be heated, this chamber being adapted to receive a vapour of a primary liquid having a boiling point which is at least equal to the said elevated temperature;

at least one passage opening into the said chamber for the entry and removal of the said article or product to be heated;

means of moving the article or product to be heated from the entry to the exit of the machine;

means of heating which are adapted to heat to boiling a primary liquid contained in a boiler and to produce primary vapour intended to be fed into the said chamber;

means for establishing in the said passage a body of vapour of a secondary liquid having a boiling point which is lower than that of the primary liquid, the said body completely filling a section of the said passage;

primary means of condensation which are adapted to condense primary vapour to primary liquid;

means of collecting primary condensate which are adapted to collect the condensed primary vapour and to redirect it to the boiler;

secondary means of condensation adapted to condense the secondary vapour to secondary liquid;

secondary means of collecting which are adapted to collect the secondary vapour condensate and to recycle it towards the means for establishing the body of secondary vapour, characterised in that the machine is of the "in-line" type and comprises a tunnel, means of moving the articles or products to be heated from the entry of the said tunnel to the exit thereof, and, in this order, a first chamber for condensing secondary vapour, a second chamber for vaporising secondary liquid and for complementary condensation of the primary vapour, a third chamber for heating the article or product to be heated and which is filled with primary vapour, a fourth chamber for vaporising secondary liquid and for complementary condensation of the primary vapour, and a fifth chamber for condensing secondary vapour, these chambers having a cross-section which is greater than that of the tunnel, being distributed along the said tunnel and being connected to each other by sections of the said tunnel.

The fact that the various chambers of the machine of the invention are at a distance from each other and communicate with each other only via tunnel sections of a reduced cross-section, prevents or greatly minimises the mixing of vapours as well as leakages of vapour into the atmosphere, which is a positive factor for the regularity and economy of operation.

Optionally, but preferably, the machine additionally comprises means of washing which are provided beyond the secondary means of condensing and enable the parts or products treated to be washed before or as they leave the machine, while they are still hot, which markedly facilitates their washing and saves energy.

Also preferably, the machine comprises means of controlling the boiling temperature of the primary liquid, cooperating with means making it possible to add into the boiler, when this is found necessary, a complementary portion of the more volatile component of the primary liquid, when the latter consists of a mixture of two components with different boiling points, in order to correct any excessive change in the boiling point of the mixture.

The following description, made with reference to the attached drawings, will make the invention properly understood.

FIG. 1 is a diagrammatic view, in longitudinal section, illustrating an embodiment of the invention. FIG. 2 is a view in partial cross-section along line II—II of FIG. 1 showing a detail of embodiment.

FIG. 1 shows a machine according to the invention, of the type known as "in-line".

This machine comprises a tunnel 1 through which travels an endless conveyor grid 2 made, for example, of stainless steel. Arranged along the tunnel are six spaced chambers 10, 20, 30, 40, 50 and 60. The grid 2 is used to convey the articles or products 3 to be heated in the machine and is driven by a variable-speed motor (not shown) The articles or products enter at 4 (entry) and leave at 5 (exit).

The heating chamber 30 is in the vicinity of the median part of the tunnel. On either side of chamber 30 are chambers 20 and 40 for vaporising the secondary liquid and for complementary condensation of the primary vapour. Upstream of chamber 20 and downstream of chamber 40 are chambers 10 and 50 for condensing the secondary vapour. Downstream of chamber 50 is the washing chamber 60.

The grid 2 follows a straight-line path descending slightly (an angle of approximately 7° to the horizontal) from the entry of the machine to chamber 30, a horizontal straight-line path in chamber 30, and a straight-line path rising slightly from the exit of chamber 30 to the exit of the machine. The tunnel 1 has a similar profile. This helps to retain the dense vapours of primary liquid in chamber 30 and to reduce their tendency to spread into the adjacent chambers 20 and 40 filled with less dense vapours of secondary liquid.

The heating chamber 30 incorporates thermal lagging 31 over most of its surface except for its lower part which forms a boiler 33 containing the primary liquid 34. In chamber 30, the grid 2 passes over a guide 35 consisting of a U-profiled perforated metal sheet on which are provided rollers 35a ensuring the horizontality of the grid in the chamber 30. The guide 35 is suspended in chamber 30 by fastenings and is spaoed from the walls of the chamber so as to allow free passage of the primary liquid vapours.

Boiler heating is provided, on the one hand, by a liquid-bath consisting of a heat-transfer fluid 41 in which are immersed heating elements 43 and, on the other hand, by heating elements 44 immersed directly in the primary liquid, these latter being actuated only in the event of a high demand for primary vapour, for example when a large load of articles or products is to be processed.

Chambers 20 and 40, flanking chamber 30, incorporate, on the one hand, in their lower part, heating elements 22, 42, respectively, helping to ensure the vaporisation of the secondary vapour, and, on the other hand, in their upper part secondary injectors for liquid 25 and 45, respectively, each consisting of a spraying nozzle, the temperature of the elements 22 and 42 being, however, below the boiling point of the primary liquid in order to help to condense the primary vapour which happens to enter chambers 20 and 40. The lower parts of chambers 20 and 40 have a V-shaped profile and are connected to the boiler by the conduits 38 and 37 (chamber 20) or by the conduits 40, 36 and 37 (chamber 40). A filter 39 is provided in conduit 37 upstream of the boiler in order to remove the solid particles originating from the treated articles or products and capable of having been carried along by the condensed primary vapour.

The condensation chambers 10 and 50 are powerfully cooled by cooling elements 11 and 51, respectively, consisting of a system of tubes carrying a refrigerant fluid under pressure. In an alternative embodiment, a jacket through which water is circulated could be employed. The lower parts of chambers 10 and 50 have a V-shaped profile and are connected by tubes 12 and 52, respectively, to a secondary liquid regenerator 13, itself consisting of a device for washing with water and a -filter, and intended to regenerate the condensate of secondary liquid. At the outlet of the regenerator, a pump 14 redirects the secondary liquid, via conduit 15, to the injectors 25 and 45.

Chamber 60 is the chamber for washing the treated articles or products. This chamber is fitted, in the upper part, with a nozzle 61 directed towards the grid 2 and a tank 62 for collecting the washing liquid 63. Tank 62 is connected by conduit 64 to a washing-liquid regenerator 65, at the outlet of which a pump 66 redirects the regenerated liquid, by conduit 67, towards nozzle 61. The regenerator 65 itself consists of a device for washing the used washingliquid, a filter and, if appropriate, a distillation device.

Chambers 20 and 40 are additionally provided, in the vicinity of their lower part, with temperature-measuring probes 80 and 81, respectively, which control the operation of the elements 22 and 42, respectively, to prevent the temperature of the latter from dropping below the boiling point of the secondary liquid.

The operation of the machine of the invention is as follows:

First, the boiler heating elements 43 are switched on so as to heat the primary liquid to boiling, and then pump 14 is started, together with pump 66 if washing is required.

The primary vapour coming from the boiler 33 rises along the chamber 30 and reaches its upper part, enveloping the articles to be heated which are in chamber 30 and coming into contact with them on every side. Primary vapour condenses on the articles, such as 3, which pass through chamber 30 and quickly heats them to the boiling temperature of the said vapour by transferring its latent heat of vaporisation to them. The vapour condensed in this manner flows through the perforations in the metal sheet 35 and falls back into the boiler. A part of the primary vapour, however, escapes from chamber 30, enters the tunnel 1 and enters chambers 20 and 40 where it immediately condenses in contact with the body of liquid and/or secondary vapour prevailing in these chambers. The primary condensates formed in chambers 20 and 40 are redirected by the conduits 38, 37 and 40, 36, 37 respectively to the boiler after filtration at 39. In effect, secondary liquid is injected by spraying through the injectors 25 and 45 in the upper part of chambers 20 and 40 respectively. This secondary liquid, which will typically have a relatively low boiling point, typically below 50° C., is vaporised by the combined effect of contact with the primary vapour, the temperature of which is higher, typically of the order of 50°–300° C., and of the heating elements 20 and 42, which are heated to a temperature above the boiling point of the secondary liquid but below that of the primary liquid. As a result, the secondary vapour acts as a stopper for the primary vapour, preventing it from spreading into the tunnel zones extending upstream of chamber 20 and downstream of chamber 40. Also, the secondary vapour dissolves and carries off the toxic decomposition products, such as polyfluoroisobutylenes, which could be produced by a partial thermal decomposition of the primary liquid. The secondary vapours produced in chambers 20 and 40 enter chambers 10 and 50, respectively, where they are condensed by the effect of the refrigerating elements 11 and 51, respectively, and collected in the lower part of the said chambers. From there, the secondary condensates are directed, via conduits 12 and 52, to a regenerator 13 where they are washed and filtered. At the outlet of the regenerator 13, a pump 14 recycles the regenerated secondary liquid towards the injectors 25 and 45, through the intermediary of conduit 15.

The articles or products placed on the conveyor grid 2 enter the tunnel at 4, are preheated by the secondary vapour in the chamber 20, and then move into chamber 30 where they are rapidly heated to a temperature corresponding to the boiling point of the primary liquid employed. Next, the articles or products are cooled as a result of passing through chambers 40 and 50 to a temperature which is usually in the range 50°-100° C. If required, they can finally be subjected to a washing in chamber 60. It has been found that a washing carried out in line with the heat treatment in the machine, when the articles or products are still hot, is much more efficient than a similar washing which is otherwise carried out subsequently as a separate step. The washing fluid may consist of any suitable solvent such as water, chlorinated solvents, and the like.

By varying the selection of the primary and secondary liquids and by suitably controlling the speed of the conveyor grid, it is possible to obtain any required temperature curve, namely:

a controlled rate of temperature rise;

a precise period of treatment at the required temperature;

a controlled rate of cooling.

Lastly, the machine of the invention permits the use of mixtures of two primary liquids of different boiling points when it is desired to treat articles or products at a temperature which is intermediate between the said boiling points. In such a case, since the mixture of primary liquids usually tends to become depleted in the more volatile primary component, according to the invention a temperature-measuring probe 70 is provided, immersed in the primary liquid bath and connected to a regulating device 71 with an adjustable temperature threshold. When the temperature of the bath of primary liquid exceeds the chosen temperature threshold as a result of the depletion in the more volatile primary component, the regulating device 71 calls for the actuation of a metering pump 72 which injects into the boiler, via conduit 73, a predetermined, adjustable, complementary quantity of the more volatile primary liquid component withdrawn from a storage tank 74 containing a reserve of this more volatile component.

Inert perfluorocarbon compounds are usually employed as primary liquids. Usable primary liquids which are commercially available are in particular the products with the registered trade name Fluorinert (sold by the 3M Company) the boiling points of which range, depending on the types, from 56° C. to 215° C., and with the registered trade name Galden (sold by the Ausimont S.p.A. Company of the Montedison group) the boiling points of which are in the ranges 218°-228° C. (Galden LS) and 255°-272° C. (Galden HS).

Chlorofluorocarbon compounds are usually employed as secondary liquids. Usable secondary liquids which are commercially available are in particular products sold under the registered trade name Flugene by the Chloe Chimie company, such as Flugene 113 the boiling point of which is in the region of 47° C., or under the registered trade name Freon 113 sold by E.I. Du Pont de Nemours and Company, the boiling point of which is also in the region of 47° C.

By virtue of the system for control and injection of a complement of a component of the primary liquid, the invention permits the use of a mixture of primary liquids when it is desired to obtain a processing temperature which is intermediate between the boiling points of two primary liquids.

By virtue of its improved equipment, the machine of the invention additionally permits:

a complete absence of air in the machine;

a low usage (losses) of primary liquid;

an operation guaranteeing the safety of the personnel (removal in the secondary condensates of the toxic compounds such as polyfluoroisobutylenes, which originate from a thermal decomposition of the primary liquid).

All the improvements introduced enable the machine of the invention to be considered as a universal heating implement for thermal applications such as the fusion of a product, drying, polymerisation and heat treatment in a temperature interval ranging from 50° to approximately 300° C., the upper temperature limit being restricted only by the present lack of an inert primary liquid with a boiling point in excess of 300° C. Particular applications are brazing, soldering by remelting, polymerisation of thermosetting organic monomers or resins, for example epoxy resins, with a view, for example, to produce an encapsulation or a gluing, and the like.

We claim:

1. A machine of the in-line type for heating articles or products at an elevated temperature by condensing vapor thereon, which comprises a tunnel having an entry and an exit;

means for moving articles or products to be heated through said tunnel from said entry to said exit, and first, second, third, fourth, and fifth chambers distinct from each other and having a cross-section greater than that of said tunnel distributed along said tunnel and in the stated order and being connected to each other by sections of said tunnel, said third chamber being adapted to be filled with vapors of a primary liquid having a boiling point which is at least equal to the elevated temperature at which said articles or products have to be heated, said second and fourth chambers being provided with means for establishing therein a body of vapors of a secondary liquid having a boiling point lower than that of said primary liquid so as to condense any primary vapors coming from said third chamber, said first and fifth chambers being provided with cooling means for condensing any secondary vapors coming from said second and fourth chambers, respectively, and boiler means having heating means for boiling a primary liquid in said boiler, and means for feeding said third chamber with said vapors of primary liquid;

means for collecting the condensates of primary vapors formed in said second and fourth chambers and for recycling them to said boiler means, and means for collecting the condensates of secondary vapors formed in said first and fifth chambers and for recycling them to said means for establishing the body of secondary vapors.

2. A machine according to claim 1, characterized in that it additionally comprises a sixth chamber for washing, equipped with washing means making it possible to wash the treated components or products before or as they leave the machine, while they are still hot.

3. A machine according to claim 1, characterized in that it additionally comprises means for controlling the boiling temperature of the primary liquid, cooperating with means making it possible to add into the boiler, when this is found necessary, a complementary portion of the more volatile component of the primary liquid, when the latter consists of a mixture of two components with different boiling points, in order to correct any excessive change in the boiling point of the mixture.

4. A machine according to claim 1, characterized in that the means for moving the article follow a descending path from the entrance of the tunnel to the entrance of said third heating chamber, a horizontal path in said third chamber, and an ascending path from the exit of said third chamber to the exit of the tunnel, said tunnel having a similar profile.

5. A machine according to claim 1, characterized in that the third heating chamber communicates in its lower part with a boiler and in that said means for moving pass through said third chamber while being spaced from the walls of the chamber so that the primary vapor originating from said boiler envelope the articles to be heated, contacting them both from below and from above.

* * * * *